(12) United States Patent
Byford

(10) Patent No.: US 6,843,152 B2
(45) Date of Patent: Jan. 18, 2005

(54) ROTARY INDEXING POSITIONING SYSTEM

(75) Inventor: Frank Byford, Upland, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 169 days.

(21) Appl. No.: 10/195,343

(22) Filed: Jul. 12, 2002

(65) Prior Publication Data

US 2003/0106394 A1 Jun. 12, 2003

Related U.S. Application Data

(60) Provisional application No. 60/339,195, filed on Dec. 11, 2001.

(51) Int. Cl.[7] ............................................. F16H 19/02
(52) U.S. Cl. ................................... 74/813 L; 74/813 R
(58) Field of Search ....................... 74/813 R, 813 L, 74/575

(56) References Cited

U.S. PATENT DOCUMENTS

| | | | |
|---|---|---|---|
| 2,339,986 A | | 1/1944 | Engert |
| 2,633,777 A | * | 4/1953 | Hoern .......................... 188/69 |
| 2,968,973 A | * | 1/1961 | Mead ........................... 74/822 |
| 3,020,998 A | | 2/1962 | Webb |
| 3,440,905 A | * | 4/1969 | Hirofumi ...................... 74/822 |
| 3,785,223 A | | 1/1974 | Steele |
| 3,797,333 A | | 3/1974 | Maier |
| 3,888,140 A | | 6/1975 | Mackelvie |
| 3,889,572 A | | 6/1975 | Vorgrimler et al. |
| 3,927,574 A | | 12/1975 | Rice |
| 3,945,505 A | | 3/1976 | Frisbie et al. |
| 3,960,475 A | | 6/1976 | DeLigt et al. |
| 3,961,780 A | | 6/1976 | Saj |
| 4,134,305 A | | 1/1979 | Hautau |
| 4,406,180 A | * | 9/1983 | Naumec ....................... 74/822 |
| 4,442,726 A | | 4/1984 | Poccia |
| 4,606,244 A | * | 8/1986 | Schneemann ................ 74/816 |
| 4,622,145 A | | 11/1986 | Bratten |
| 4,644,825 A | | 2/1987 | Yamazaki |
| 4,852,428 A | | 8/1989 | Haga et al. |
| 4,884,474 A | | 12/1989 | Kawata |
| 4,887,345 A | | 12/1989 | Saito et al. |
| 4,890,514 A | | 1/1990 | Wickham |
| 4,991,463 A | | 2/1991 | Kawata |
| 5,033,367 A | | 7/1991 | Florindez |
| 5,044,055 A | | 9/1991 | Howarth et al. |
| 5,064,044 A | | 11/1991 | Oketani et al. |
| 5,136,896 A | | 8/1992 | Burka |
| 5,187,847 A | | 2/1993 | Thumm et al. |
| 5,501,123 A | | 3/1996 | Swann et al. |
| 5,735,514 A | | 4/1998 | Moore et al. |
| 5,860,333 A | | 1/1999 | Feng |
| 5,974,941 A | | 11/1999 | Kushnir et al. |
| 6,240,807 B1 | | 6/2001 | Hebener et al. |
| 6,279,722 B1 | | 8/2001 | Bankuty et al. |
| 6,568,292 B1 | * | 5/2003 | Zatterqvist ................... 71/319 |

FOREIGN PATENT DOCUMENTS

| | | | | |
|---|---|---|---|---|
| JP | 58-28044 | * | 2/1983 | ............... 74/813 R |
| JP | 61-178158 | * | 8/1986 | ............... 74/813 R |

* cited by examiner

*Primary Examiner*—David A. Bucci
*Assistant Examiner*—Vicky A. Johnson
(74) *Attorney, Agent, or Firm*—John A. Molnar, Jr.

(57) ABSTRACT

A positioning system for controlling the rotation of a shaft or other member through a defined angular increment. The system includes a rotor which may be coupled in torque transmitting communication with the shaft, and a an indexing assembly for driving the rotor. The indexing assembly includes a slide or other follower which is operably coupled to a first actuator, which may be hydraulically or other otherwise fluid-powered, and to a biasing member, which may be a second actuator, which is also operably coupled to the first actuator. The first actuator is actuable to move the follower and, in turn, a pawl from a locking position to a release position, and to engage another pawl with the rotor effecting the rotation thereof in a rotary direction through the angular increment. The first actuator is de-actuable to return, responsive to the biasing member, the pawls and follower to their original positions.

20 Claims, 6 Drawing Sheets

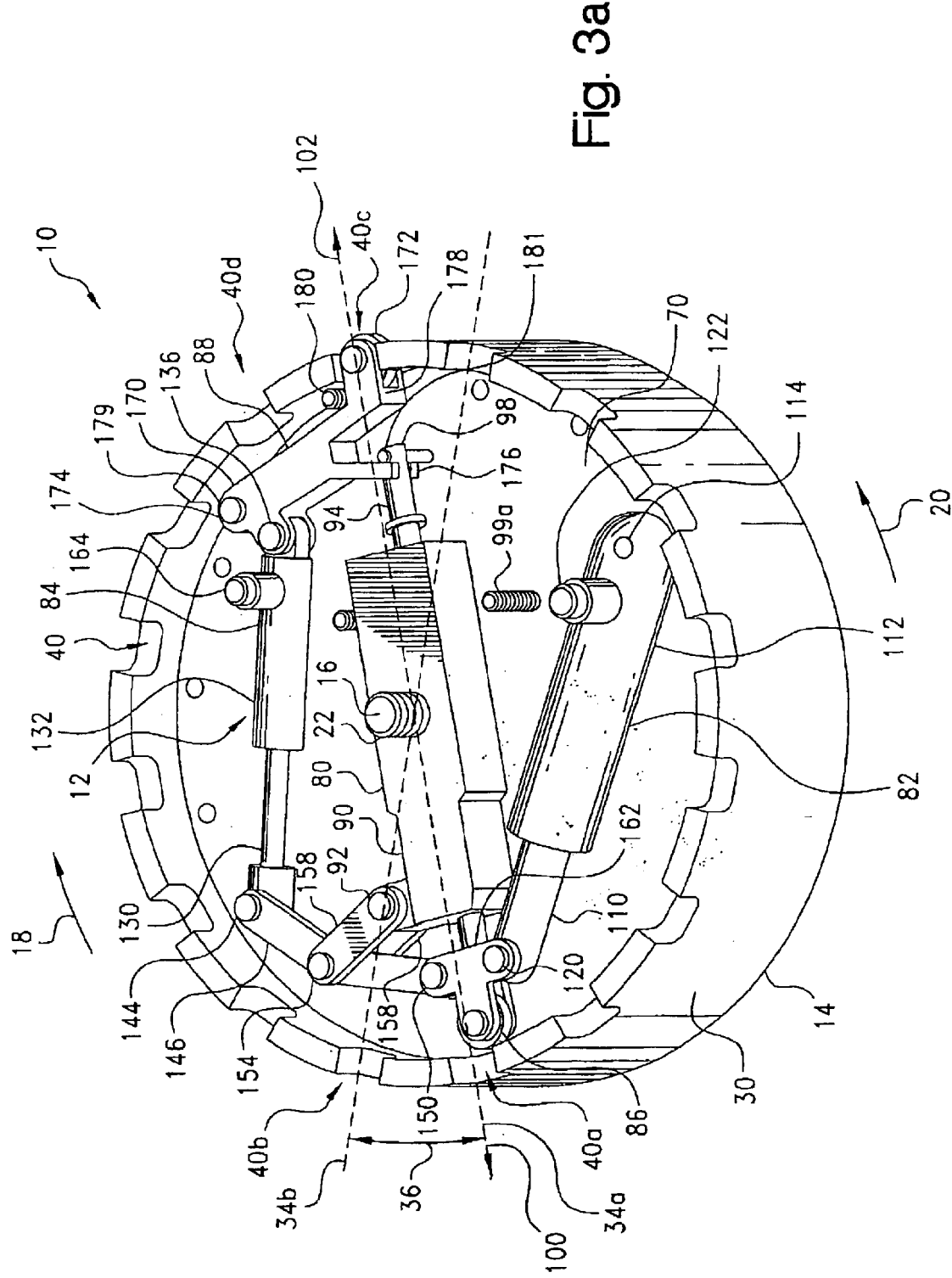

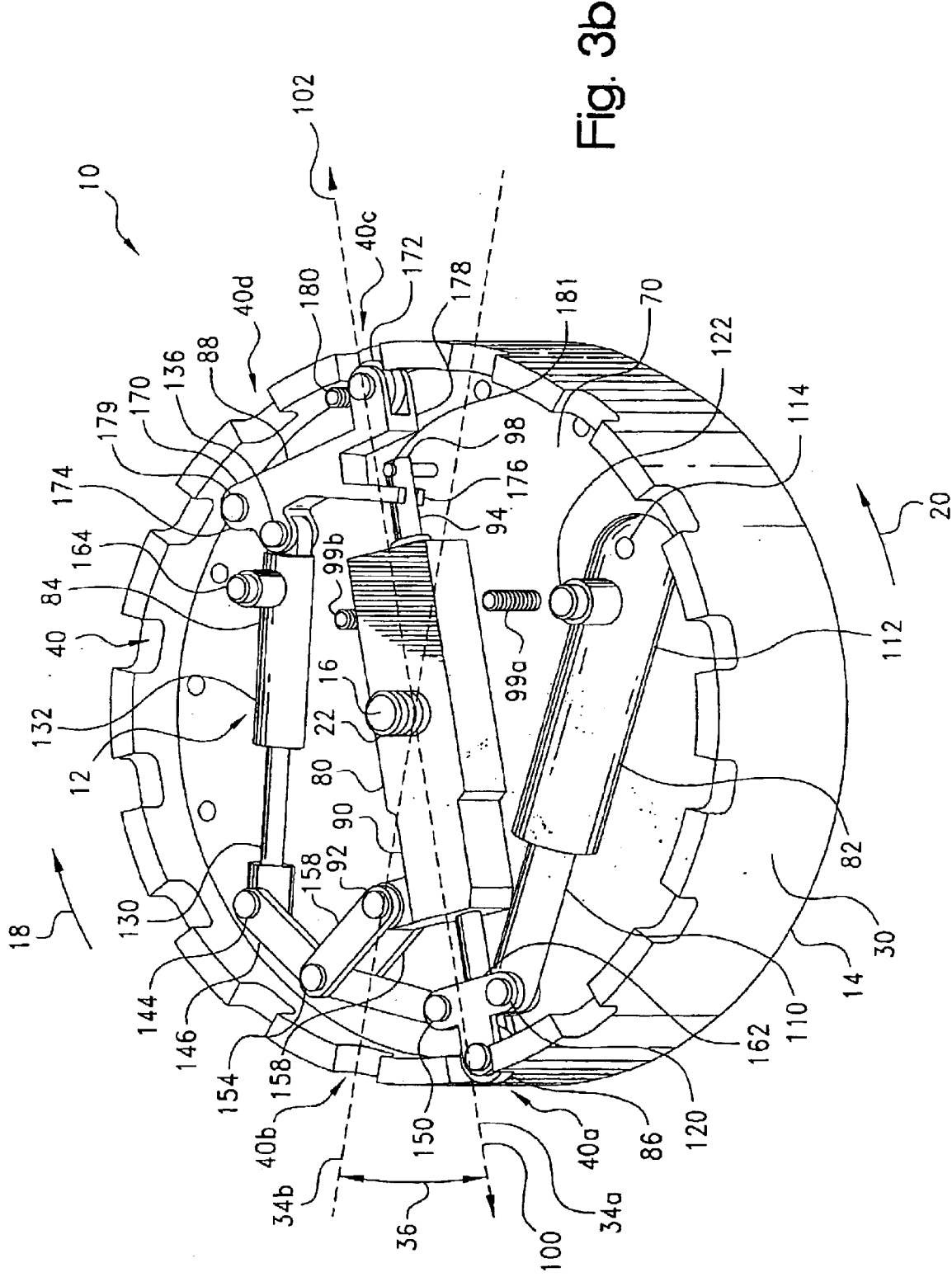

ROTARY INDEXING POSITIONING SYSTEM

CROSS-REFERENCE TO RELATED CASES

The present application claims the benefit of the filing date of U.S. Provisional Application Ser. No. 60/339,195; filed Dec. 11, 2001, the disclosure of which is expressly incorporated herein by reference.

BACKGROUND OF THE INVENTION

The present invention relates generally to positioning systems used for controlling the rotation of a shaft or other member through a defined angular increment, and more particularly to an indexing assembly therefor which may be hydraulically or pneumatically powered and which is less complicated than prior devices but which is robust and which provides for precise and reliable angular positioning.

A variety of mechanical, electromechanical, fluid power, and electronic rotary indexing mechanisms are known and used in a host of commercial, industrial, mobile, and military applications for providing incremental rotation of a shaft or the like through a selected angular increment. Mechanical devices include pawl and ratchet assemblies in which a first pawl rotates a ratchet and a second pawl maintains the rotated ratchet at its end-of-movement position, as well as detent mechanisms in which a resiliently-biased detent member engages the rotated member at selected detent positions. Electro-mechanical devices typically employ solenoids or other electromechanical actuators that have been adapted to drive mechanical mechanisms. Fluid power devices may utilize hydraulic motors or a pump or other source of fluid pressure in conjunction with an arrangement of hydraulic or pneumatic cylinders. Electronic devices generally involve the use drive motors, typically of the stepper variety, in conjunction with position sensors to control of the magnitude of displacement of the rotary increment and to signal the stop position of the rotated member. Devices illustrative of the foregoing are shown, for example, in U.S. Pat. Nos. 6,279,722; 6,240,807; 5,974,941; 5,860,333; 5,735,514; 5,501,123; 5,187,847; 5,136,896; 5,073,514; 5,064,044; 5,044,055; 5,033,367; 4,991,463; 4,890,514; 4,890,514; 4,887,345; 4,884,474; 4,852,428; 4,644,825; 4,622,145; 4,442,726; 4,134,305; 3,961,780; 3,960,475; 3,945,505; 3,927,574; 3,889,572; 3,888,140; 3,888,140; 3,797,333; 3,785,223; 3,020,998; and 2,339,986.

The above-described rotary indexing devices heretofore known in the art have proved satisfactory for a diversity of uses. However, each may offer specific advantages and disadvantages in any particular application. For example, in certain applications, electrical or hydraulic motors may require excess power input and can constitute a considerable expense relative to those applications. Also, in applications requiring high speeds, concerns may exist regarding inertia and the ability to stop the device or otherwise to achieve accurate positioning. Electric motors, moreover, generally are not specified for use in explosive atmospheres.

The aforementioned devices have constituted the state of the art with respect to rotary indexing assemblies. It is believed, however, that further improvements in such assemblies continue to be desired by industry and, particularly, by the military for aerospace applications such as for use as a carousel actuator in the delivering of ordinance from aircraft and other platforms. In this regard, a preferred assembly would be economical to manufacture, but additionally would be reliable, lightweight, and compact so as to be easily integrated into a variety of system designs.

BROAD STATEMENT OF THE INVENTION

The present invention is directed to an improved rotary indexing assembly particularly adapted for use within a positioning system for controlling the rotation of a shaft or other member through a defined angular increment. In accordance with the precepts of the present invention, the indexing assembly is provided as including a first actuator which may be provided as a hydraulic, pneumatic, or other fluid-powered linear actuator or other cylinder-type device which is used to drive a ratcheting mechanism. The ratcheting mechanism, in turn, drives a drum or other rotor through a predetermined angular displacement. Such rotor may be coupled in torque-transmitting communication with a shaft which, in turn, may be connected to an output device such as an another shaft, a gear, or other machine component within the system application.

In an illustrated embodiment, the indexing assembly is integrated within a positioning system for controlling the rotation of a shaft which itself is journalled with a drum-shaped rotor to be rotatable therewith in counter first and second rotary directions about a central axis. The rotor may have a generally annular radial portion which is disposed coaxially with the central axis. Such radial portion itself may have a diametric extent defined by a locus of diametral axes.

Within the described system, the first actuator is operably coupled with a slide or other follower having a first and a second end. The follower may be supported within the assembly intermediate the first and second end thereof to be rotatable in a first and a second rotary direction about the central axis for its positioning in alignment with a first and a second diametral axis having a given angular displacement therebetween which defines and indexing increment of the rotor. The follower further may be provided to be movable along the diametral axes in a first radial direction towards the follower first end for the disposition of the follower in a first operating position, and in a second radial direction towards the follower second end for the disposition of the follower in a second operating position. The first actuator thereby is actuable from a retracted or other de-actuated position to an extended or other actuated position effecting the movement of the follower in the first radial direction, and the rotation of the follower in the first rotary direction.

The follower further is operably coupled with a biasing member, which may be provided as a second fluid-powered actuator, and which also is operably coupled the first actuator. The second biasing member normally biases the follower in its second position and the first actuator in its de-actuated position, and also urges the rotation of the follower in the second rotary direction.

A first pawl is operably coupled with the follower first end for movement therewith. The first pawl is disposed in the first position of the follower in an engagement with the radial portion of the rotor effecting the rotation thereof in the first rotary direction responsive to the rotation of the follower in the first rotary direction, and being disposed in the second position of the follower in a clearance relationship with the radial portion of the rotor.

A second pawl is operably coupled with the follower second end and with the biasing member for movement between a locking position disposing the second pawl in an engagement with the radial portion of the rotor delimiting the rotation thereof, and a release position disposing the second pawl in a clearance relationship with the radial portion of the rotor. The second pawl is normally biased in its locking position by the biasing member, and is movable with the movement of the follower along the first one of the diametral axes from the second position to the first position from the locking position to the release position.

The follower is normally positioned in alignment with the first one of the diametral axes, with the biasing member biasing the follower in the second position, the actuator in the de-actuated position, and the second pawl in the locking position. In operation, the actuator is actuable from the de-actuated position to the actuated position effecting the movement of the follower from the second position to the first position and the movement of the second pawl from the locking position to the release position, and engaging the first pawl with the radial portion of the rotor. Such engagement, in turn, effects the rotation of the rotor in the first rotary direction by the indexing increment responsive to the rotation of the follower in the first rotary direction and into alignment with the second one of the diametral axes. Thereupon, with the follower being positioned in alignment with the second one of the diametral axes with the rotor having been rotated by the indexing increment, the actuator is de-actuable to return responsive to the biasing member the second pawl to the locking position and the follower to the second position effecting the rotation of the follower in the second rotary direction and into alignment with the first one of the diametral axes.

The present invention, accordingly, comprises the system possessing the construction, combination of elements, and arrangement of parts which are exemplified in the detailed disclosure to follow. Advantages of the invention includes a rotary indexing assembly which is particularly adapted for aerospace and other applications requiring a robust mechanism which is lightweight and also compact so as to be easily integrated into the system application. Additional advantages of the present invention include an rotary indexing assembly which does not rely on the use of motors. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIGS. 3A–3D are solid model animations showing the operational sequence of the assembly and system of FIGS. 1 and 2.

Figure 1:
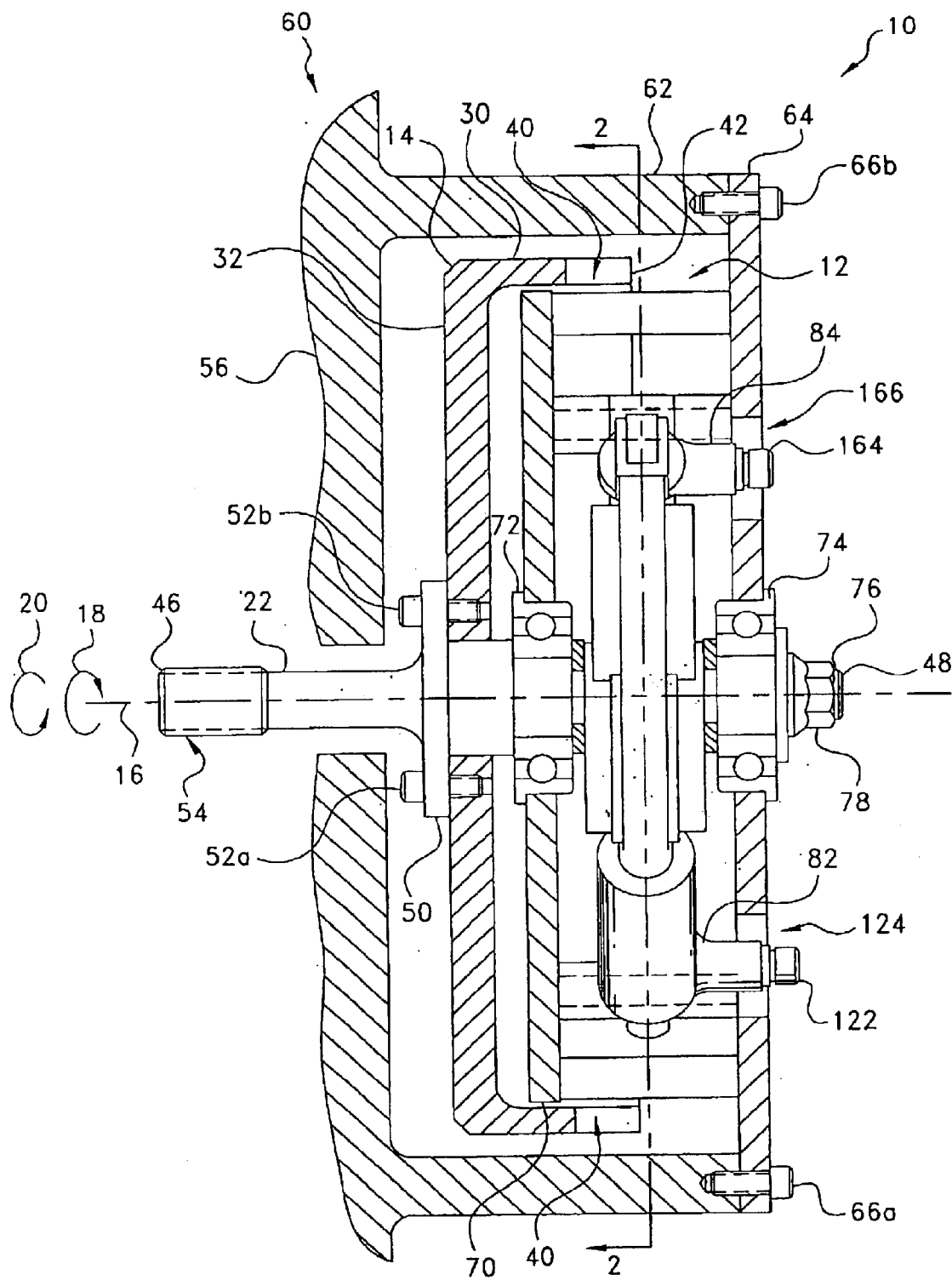
FIG. 1 is an axial cross-sectional view of an embodiment of a rotary indexing assembly in accordance with the present invention as integrated within a representative positioning system.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, the terms "radial" and "axial" referring, respectively, to directions or planes perpendicular and parallel to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the rotary indexing assembly of the present invention are described in conjunction with its adaptation for use within a positioning system which may include a drum-shaped rotor which is coupled in torque-transmitting communication to a shaft. In view of the discourse to follow, however, it will be appreciated that aspects of the present invention may find utility in other positioning systems requiring a compact, lightweight, and economical mechanism which does not rely on the use of an electric or hydraulic motor. Use within those such other applications therefore should be considered to be expressly within the scope of the invention herein involved.

Figure 2:
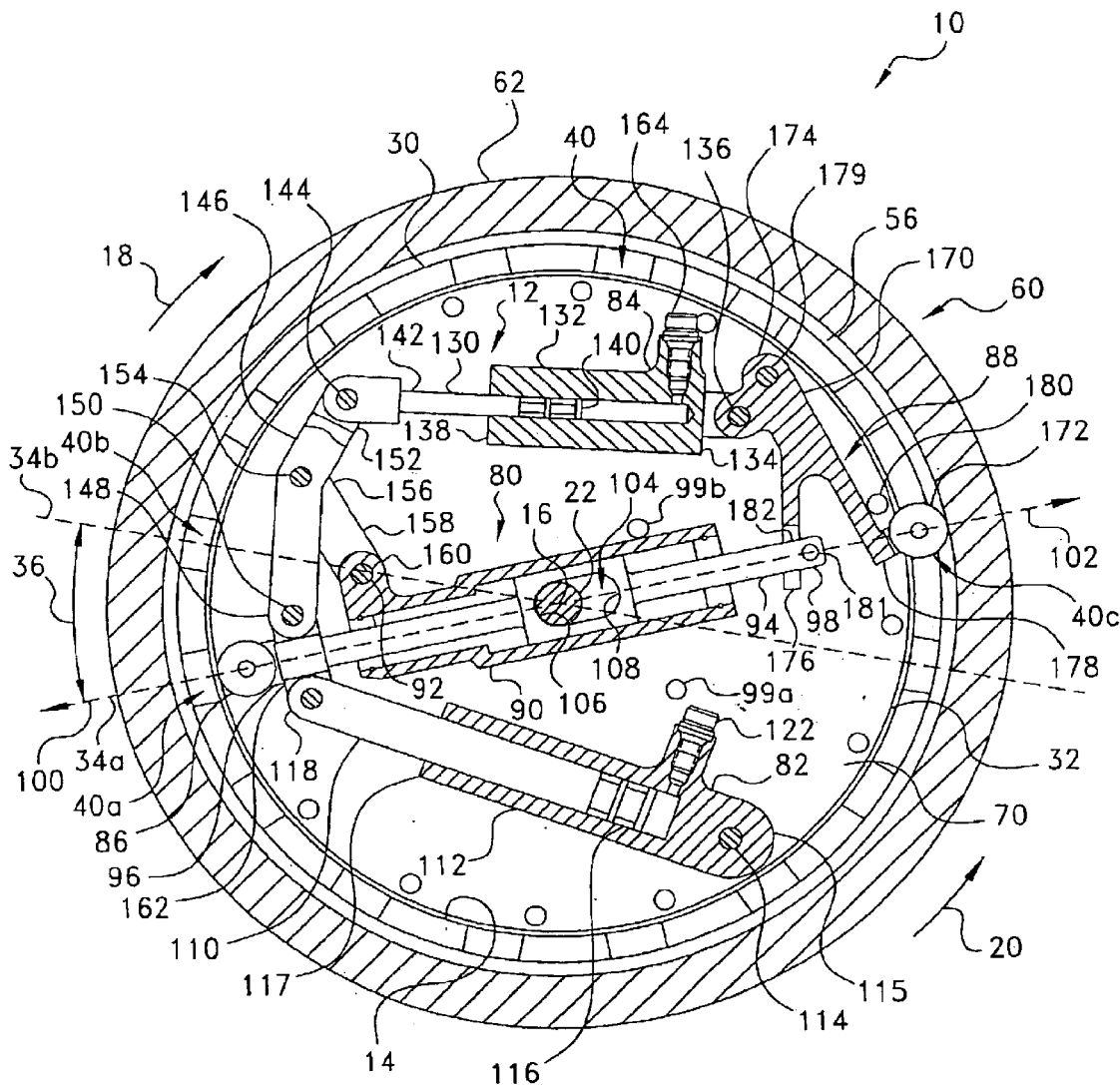
FIG. 2 is a radial cross-sectional view of the assembly and system of FIG. 1 taken through line 2—2 of FIG. 1, with certain elements in FIG. 2 being shown as projected from their position in FIG. 1 for explanatory purposes.

Referring then to the figures wherein corresponding reference characters are used to designate corresponding elements throughout the several views with equivalent elements being referenced with prime or sequential alphanumeric designations, a representative positioning system is shown generally at 10 in the cross-sectional views of FIGS. 1 and 2 as integrated with a representative embodiment, referenced generally at 12, of a rotary indexing assembly in accordance with the present invention. In basic construction, system 10 includes, in addition to assembly 12, a rotor, 14, which is rotatable about a central axis, 16, in a first rotary direction, referenced at 18, and in a counter second rotary direction, referenced at 20, and a shaft or shaft, 22, having a longitudinal axis which is aligned coaxially with the central axis 16.

In the illustrative embodiment, rotor 14 is generally drum-shaped in having a generally annular radial wall or other portion, 30, disposed coaxially with the central axis 16, and a generally planar end wall or other portion, 32, disposed transverse to the axis 16. The radial portion 30 has a diametric extent defined by a locus of diametral axes, a first one of which axes is referenced at 34a in FIG. 2, and a second one of which axes is referenced at 34b. The axes 34a–b have a given angular displacement, referenced at 36, therebetween which, as will be described hereinafter, defines an indexing increment of the rotor 14 and the shaft 22.

The rotor radial portion 30 includes a series of circumferentially spaced-apart receiving portions, commonly referenced at 40, with a first one of which is referenced at 40a in FIG. 2, and an adjacent second one of which is referenced at 40b, which receiving portions may be provided as slots or other openings formed into a distal peripheral end, referenced at 42 in FIG. 1, of the radial portion 30. Each of the receiving portions 40 generally may be spaced-apart about the radial portion 30 equally from each adjacent one of the portions 40 by the measure of the angular displacement 36. As is shown in FIG. 2 for portions 40a–b and, respectively, axes 34a–b, each of the portions 40 also is aligned in registration with a corresponding one of the diametral axes 34.

Shaft 22, which may be of a unitary construction or, alternatively, as including one or more discreet shaft portions, extends, as may be seen best in FIG. 1, between a rearward end, 46, and a forward end, 48, and is coupled in torque-transmitting communication with the rotor 14, such as by means of a connecting flange, 50. Flange 50 may be formed, journalled, or otherwise provided intermediate the shaft rearward and forward ends 46 and 48, and may be bolted, such as with fasteners 52a–b, or otherwise attached to the rotor end portion 32 for the rotation of the shaft 22 with the rotor 14. The surface of the shaft rearward end 46 may be splined, toothed, or otherwise configured as is shown at 54 for a driving engagement with an associated belt, gear, or other machine part.

As may be seen best in the axial cross-sectional view of FIG. 1, the shaft rearward end 46 further may be journaled through an end wall or other portion, 56, of a housing or other enclosure, referenced generally at 60, within which the components of the positioning system 10 otherwise are received in a hub-like fashion. Housing 60 additionally may include a generally tubular side wall portion, 62, and a cover portion, 64, which can be bolted, such as by means of fasteners 66a–b, or otherwise removably affixed to the side wall portion 62.

As an additional member of the illustrated arrangement of the positioning assembly 10, a base plate or other supporting structure, 70, may be disposed transverse to the central axis 16 intermediate the rotor end wall 32 and the constituent components of the indexing assembly 12 for the mounting of such components relative to the shaft 22. In this regard, the shaft 22 may be rotatably received through the base plate 70 such as by means of a commonly-journalled ball, roller or other bearing part, 72, which is interposed between the base plate 70 and the shaft 22, and which supports the shaft intermediate the rearward and forward ends 46 and 48 thereof. Similarly, the shaft forward end 48 may be rotatably received through the housing cover portion 64 such as by means of a commonly-journalled bearing part, 74, interposed therebetween the shaft 22 and the cover portion 64. The shaft forward end 48, which may be threaded as at 76, may be secured to the housing cover portion 62 via a retaining nut, 78.

As may be seen best in the radial cross-sectional view of FIG. 2, indexing assembly 12 includes a follower mechanism, 80, a first actuator, 82, which may be of a linear variety, a biasing member, 84, which may be provided as a second actuator of a linear variety or, alternatively, a compressible spring or the like, a first pawl arrangement, 86, and a second pawl arrangement which is referenced generally at 88. In the illustrated embodiment, follower mechanism 80 includes an open-ended, generally tubular follower housing, 90, one end of which is pivotally supported at 92 on base plate 70, and a generally elongate slide, 94, slidably received within housing 90, which slide extends intermediate a first end or terminus, 96, and a second end or terminus, 98. Housing 90 is rotatable about pivot 92 intermediate an angularly spaced-apart pair of stops, 99a-b, in the first and second rotary directions 18 and 20.

Slide 94 is supported between its ends 96 and 98 to be rotatable with the housing 90 in the first and second rotary directions 18 and 20 for the positioning of the slide in alternating alignment with the first and second diametral axes 34a-b, and to be movable along the diametral axes 34 in a first radial direction, referenced at 100, towards the slide first end 96 for the disposition of the follower mechanism 80 in a first position (not shown in FIG. 2), and in a second radial direction, referenced at 102, towards the slide second end 98 for the disposition of the follower mechanism 80 in a second position which is shown in FIG. 2.

For being rotatably and slidably supported, slide 94 may be provided as having a generally oblong, oval, or other elongate circular slot or opening, referenced at 104, formed intermediate the slide first and second ends 96 and 98. As is shown in FIG. 2, slot 104 may be formed as extending between a first end, 106, and a second end, 108, with shaft 22 or a portion thereof being received therethrough. In this way, slide 94 thereby may be made rotatable about the shaft in the first and second rotary directions 18 and 20, and also movable on the shaft 22 in the first radial direction into an abutting engagement of the slot second end 108 with the shaft 22 defining the first position of the follower mechanism 80, and in the second radial direction into an abutting engagement of the slot first end 106 with the shaft 22 defining the second position of the follower mechanism 80.

First actuator 82 includes an elongate rod, 110, and a generally cylindrical housing, 112, a closed end, 115, of which housing is pivotally supported at 114 on base plate 72 for rotation in the first and second rotary directions 18 and 20 following the rotation of the follower housing 90 and slide 94 of the follower mechanism 80. Rod 110 is reciprocatingly slidably moveable within the housing 112 in the directions of the closed end 115 and an opposite housing open end, 117, thereof, and has a sealed rod first end, 116, received within the housing 112 though the open end 117, and a rod second end, 118, which is pivotally coupled at 120 to the follower first end 96. As operably coupled to the follower first end 96, rod 110 is movable in the direction of the housing open end 117 from the retracted orientation shown in FIG. 2 corresponding to a de-actuated position of the first actuator 82, to an extended orientation corresponding to an actuated position of the first actuator effecting the movement of the follower slide 94 in the first radial direction 100, and the rotation thereof in the first rotary direction 18.

Preferably, the movement of actuator rod 110 is controlled responsive to a hydraulic or other fluid pressure admitted into the actuator housing 112 such as via a port, 122, which may be accessible, as may be seen with momentary reference to FIG. 1, through an opening, 124, provided in the system housing cover portion 64. In a representative fluid circuit (not shown), port 122 may be connected in a conventional manner in fluid communication with a solenoid or other valve device for the control of fluid pressure to the actuator 82.

Second actuator 84 is operably coupled with the follower mechanism 80 and the first actuator 82, and, as is shown in FIG. 2, in an extended orientation normally biases the follower in its second position and the first actuator in its de-actuated position, and further urges the rotation of the follower in the second rotary direction 20. Similar to the first actuator 82, second actuator 84 may include an elongate rod, 130, and a generally cylindrical housing, 132, a closed end, 134, of which housing is pivotally coupled at 136 to the second pawl arrangement 88 for rotation in the first and second rotary directions 18 and 20 following the rotation of the follower housing 90 and slide 94 of the follower mechanism 80. Rod 130 is reciprocatingly slidably moveable within the housing 132 in the directions of the closed end 134 and an opposite open end, 138, thereof, and has a sealed rod first end, 140, received within the housing 132 though the open end 138, and a rod second end, 142, which is pivotally connected at 144 via an angled moment arm or other linkage member, 146, to the follower first end 96.

As shown in FIG. 2, moment arm 146 spans between a first end, 148, pivotally coupled at 150 in torque or other angular force transmitting communication with the first actuator second rod end 118, and a second end, 152, pivotally coupled at 144 in angular force transmitting communication with the second actuator rod second end 142. Moment arm 146 additionally is pivotally coupled at 154 at a vertex intermediate the arm first and second ends 148 and 152 in torque or other angular force transmitting communication with the first end, 156, of a generally linear linkage member, 158, having a second end, 160, which is pivotally coupled at 92 in angular force transmitting communication with the follower housing 90. Although not shown in FIG. 2, it will be appreciated that a pair of linkage members 158 may be provided with one mounted in a straddling arrangement on each side of the moment arm 146.

As operably coupled in the manner described to the follower first end 96 and, in turn, rod 110 of the first actuator 82 such as via a common attachment collar, 162, or the like mounted on the rod 110 first end 118, rod 130 of the second actuator 84 is moved, responsive to the actuation of the first actuator 82 and the extension of the first actuator rod 110, from its normally-biased extended orientation shown in FIG. 2 to a retracted orientation accommodating the rotation of the follower mechanism 80 in the first rotary direction 18. In turn, first actuator rod 110 is moved, upon the de-actuation of the first actuator 82 and responsive to return of the second actuator rod 130 from a retracted to is normally-biased, extended orientation, from its extended orientation to a retracted orientation accommodating the rotation of the follower mechanism in the second rotary direction. Further in this regard, by virtue of the connection of follower housing 90 to arm 146 via linkage 158 and the connection of the slide first end 96 to the first actuator rod first end 118 and, via arm 146, to the second actuator rod second end 142, housing 90 and slide 94 of the follower mechanism 80 are provided within the indexing assembly 12 to be in a driven relationship with the actuator rods 110 and 130 effecting the corresponding rotation of the follower 80 in the first and second rotary directions 18 and 20, and the corresponding movement of the slide 94 in the first and second axial directions 100 and 102.

As with the first actuator rod 110, the movement of the second actuator rod 130 preferably is controlled responsive to a hydraulic or other fluid pressure admitted into the actuator housing 132 such as via a port, 164, which may be accessible, as may be seen with momentary reference to FIG. 1, through an opening, 166, provided in the system housing cover portion 64. In a representative fluid circuit (not shown), port 164 may be connected in a conventional manner to deliver a constant line pressure to the actuator 84. In this regard, it will be appreciated that the actuators 82 and 84 are sized so as to develop a differential force imbalance such that pressurization or other actuation of the first actuator 82 effecting the extension of the rod 110 thereof develops a motive force which can overcome the biasing force developed by constant pressurization or other energization of the second actuator 84. Moreover, it will be appreciated that the angular velocity of the rotation of rotor 14 and shaft 22 may be controlled, for example, by the control of the pressure and/or flow rate at which fluid is admitted or supplied to one or both of the first and second actuators 82 and 84. Advantageously, such fluid pressure operation of the indexing assembly 12 obviates the need for elaborate electronics or other controls.

First pawl arrangement 86 is operably coupled with the follower first end 96 for movement therewith and, in the illustrated embodiment 10 of FIG. 2, is configured as a first roller or other bearing which is mounted or otherwise supported or carried on the follower first end 96 and which is configured to be received within the openings 40 formed into the rotor radial portion 30. As carried on the follower first end 96, first roller 86 is disposed in the first position (not shown in FIG. 2) of the follower mechanism 80 as received within or otherwise bearingly engaged with, for example, opening 40a of the rotor radial potion 30 effecting the rotation of the rotor 14 in the first rotary direction 18 responsive to the rotation of the follower mechanism 80 in that direction. Further, first roller 86 is disposed in the second position (shown in FIG. 2) of the follower mechanism 80 in a clearance relationship with the rotor radial portion 30 accommodating the rotation thereof in the second rotary direction 20 as urged by biasing force developed by the second actuator 84.

In turn, second pawl arrangement 88, which may include a Y- or yoke-shaped linkage, 170, and a second roller or other bearing, 172, configured to be received within the rotor openings 40, is operably coupled with the follower second end 98 and also with the second actuator 84 for movement between a locking position, shown in FIG. 2, and a release position. In the locking position, the second roller 172 is received within or otherwise bearingly engaged with, for example, the rotor radial portion opening referenced at 40c, so as to delimit the rotation of the rotor 14. In the release position, second roller 172 is disposed in a clearance relationship with the rotor radial portion 30 allowing for the rotation of the rotor 14 in the first rotary direction 18.

Linkage 170 is shown to be configured as having a vertex end, 174, and an opposite end formed as a bifurcate first arm portion, 176, and a second arm portion, 178, on which second roller 172 is mounted or otherwise supported. The vertex end 174 of linkage 170 is pivotally supported at 179 on base plate 70 for rotation in the first and second rotary directions 18 and 20, and is pivotally coupled at 136 in force transmitting communication with the closed end 134 of the second actuator housing 132 to be responsive to the movement and positioning of the second actuator 84, and to forces developed thereby. The pivot 136 itself is pivotable about the pivot 179 in the first and second rotary directions 18 and 20 to accommodate the rotation of the linkage 170 about the pivot 179.

Second actuator 84 normally biases the second pawl arrangement 88 in its locking position by a reaction force urging the rotation of linkage 170 in the second rotary direction 20 about pivot 179 and into an abutting engagement of the linkage second arm portion 178 with an outward stop, 180. Second pawl arrangement 88 is movable, however, from the locking position to its release position upon the movement of the follower mechanism 80 along diametral axis 34a from its second position to its first position.

That is, in the locking position of the second pawl arrangement 88, linkage 170 is workingly engageable in the second position of the follower slide by the second end 98 thereof. Such end 98 may be configured as having a transverse pin or other projection, 181, so as to be generally T-shaped or otherwise pivotably receivable in the second position of the follower slide 94 between the linkage first and second arm portions 176 and 178, with a rearward portion, 182, of the slide 94 being receivable between the bifurcate first arm portion 176, as follower mechanism 80 is rotated in the second rotary direction 20 from alignment with the second diametral axis 34b and into alignment with the first diametral axis 34a. Thereupon, with the movement along axis 34a of the slide 94 from its second position to its first position, pin 181 is able to engage the linkage first arm portion 176 effecting the rotation of the linkage 170 in the first rotary direction 18 about pivot 179 and the corresponding movement of the second roller 172 from its locking position in engagement with a corresponding rotor opening 40, such as opening 40c, to its release position allowing for the rotation of rotor 14 in the first rotary direction 18. As rotor 14 so rotates responsive to the actuation of the first actuator 82 and the extension of the rod 110 thereof, and-with the follower mechanism 80 being moved out of alignment with the first diametral axis 34a and into alignment with the second diametral axis 34b, the slide second end 98 is pivoted out of engagement with the linkage 170. However, during such rotation of the rotor 14 in the first rotary direction 18, the second pawl arrangement 88 is maintained in its release position by a reaction force developed by the second actuator 84 urging the rotation of linkage 170 in the first rotary direction 18 about pivot 179.

Figure 3C:
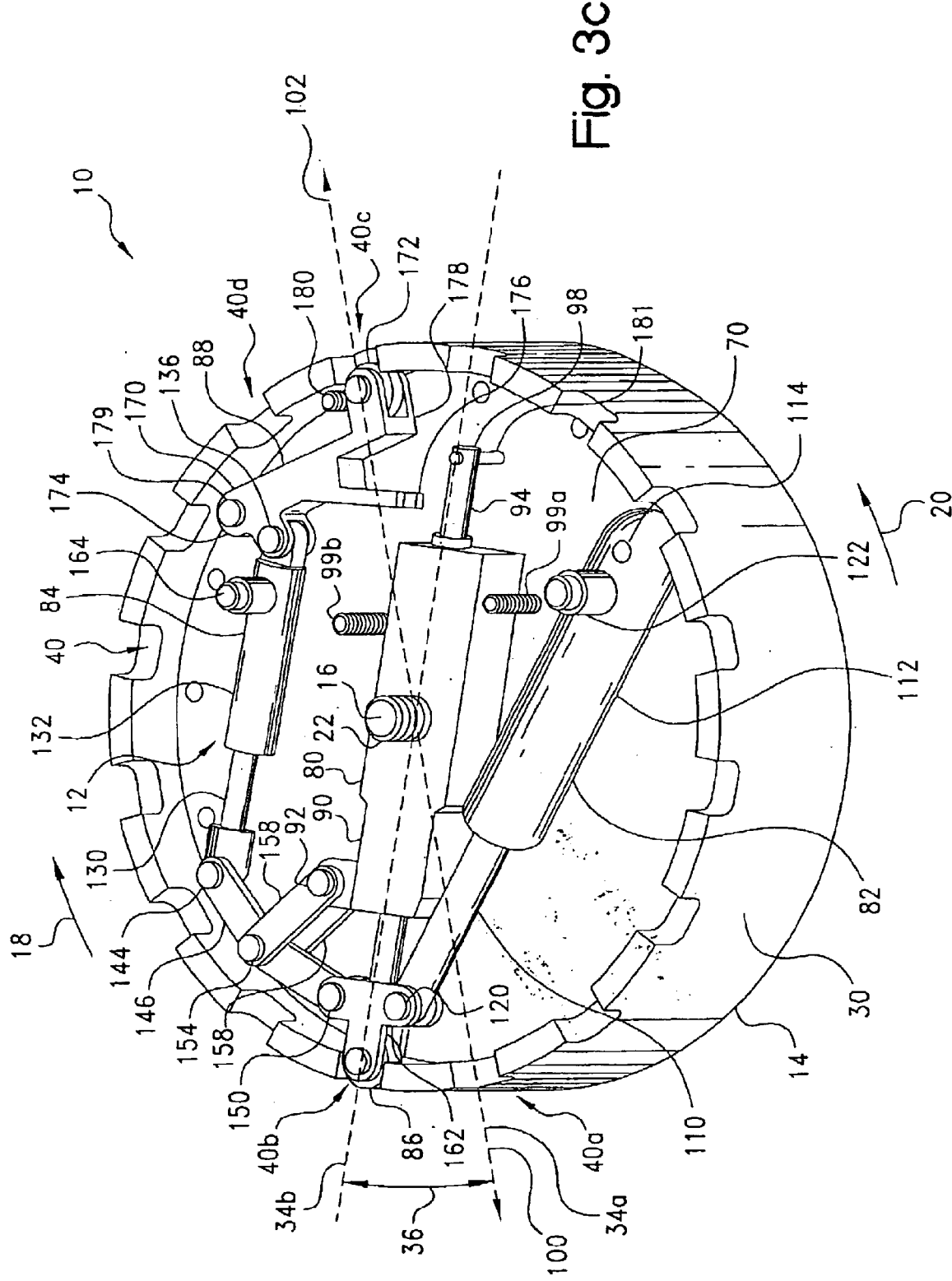
Figure 3D:
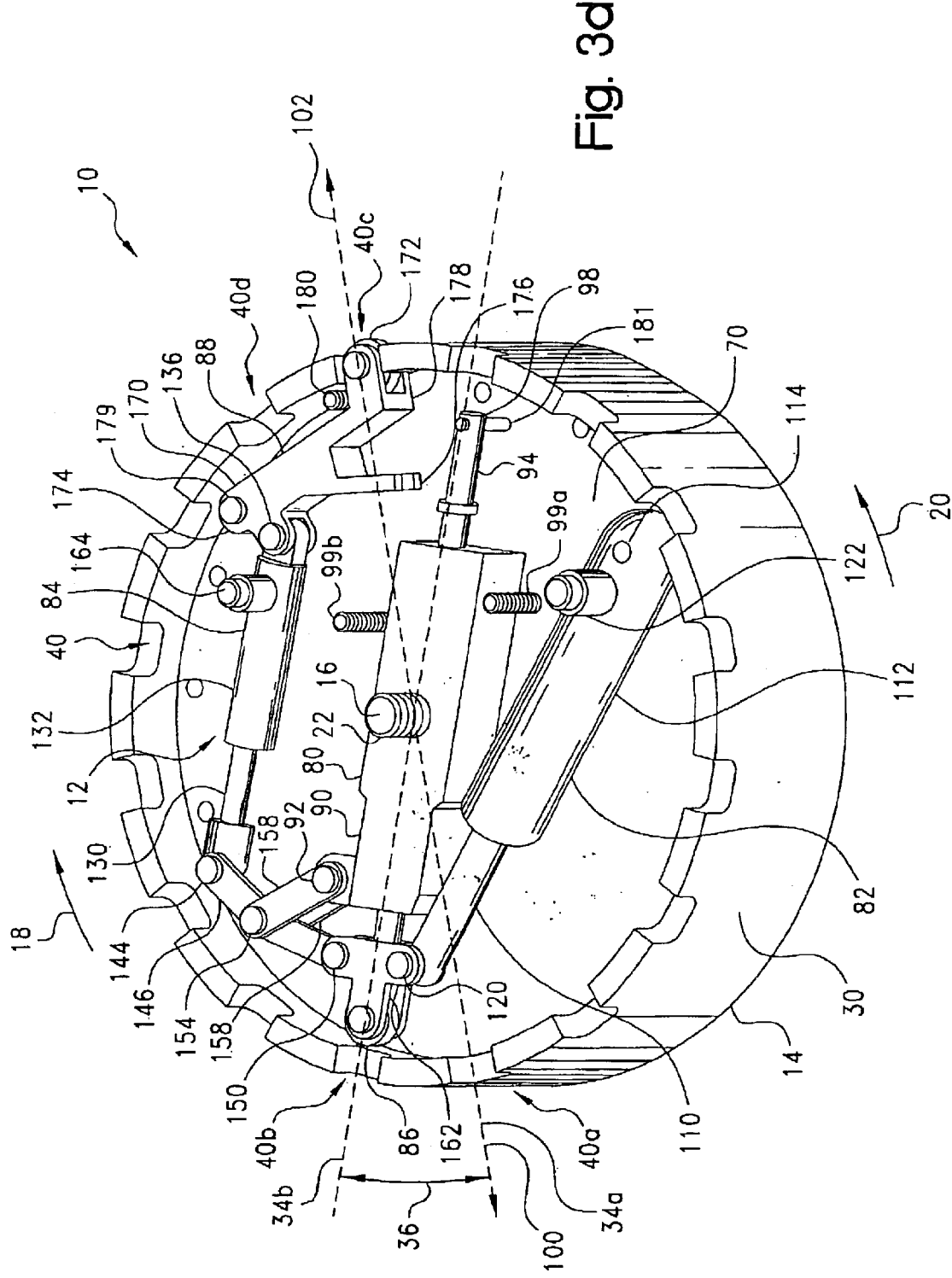

Considering lastly an illustrative operational sequence of indexing assembly 12 of the present invention as incorporated within the representative positioning assembly 10 of FIGS. 1 and 2, reference may be had to the solid model animations shown in FIGS. 3A–3D. With reference first to FIG. 3A, the sequence commences with follower mechanism 80 being positioned in alignment with the first diametral axis 34a, and with the second actuator 84 biasing the follower slide 94 in its second position, and biasing the first actuator 82 in its de-actuated position and the second pawl arrangement 88 in its locking position engaged with rotor opening 40c.

With reference next to FIG. 3B, the sequence continues with the first actuator 82 being actuated from its de-actuated position to its actuated position. Such actuation effects the movement of the follower slide 94 in the first radial direction 100 along axis 34a from its second position to its first position and the movement of the second pawl mechanism 88 from its locking position to its release position, and the engagement the first pawl 86 with the rotor opening 40a. As may be appreciated with reference next to FIG. 3C, the continued extension of first actuator rod 110 into its extended orientation (as shown in FIG. 3C), effects the rotation of the rotor 14 in the first rotary direction 18 by the indexing increment 36 responsive to the rotation of the follower mechanism 80 in the first rotary direction 18 and into alignment with the second diametral axis 34b. Thereupon, with the follower mechanism 80 being so aligned with the second diametral axis 34b and upon the rotor 14 having been rotated by the indexing increment 36, the first actuator 82 is de-actuable to return, responsive to the returning of the second actuator rod 130 to its normally-extended orientation, the second pawl arrangement 88 to its locking position in engagement with the rotor opening referenced at 40d. Concomitantly therewith, follower slide 94 is moved along second diametral axis 34b in the second radial direction 102 for its return to its second position. With the rotation of the follower mechanism 80 in the second rotary direction 20 and into alignment again with the first diametral axis 34a, the sequence may again commence with FIG. 3A in a cyclic operation.

Thus, a unique, rotary indexing assembly arrangement is disclosed which is particularly adapted for aerospace and other applications requiring a compact, reliable, lightweight, and cost-effective positioning capability.

Unless otherwise specified, materials of construction suitable for the positioning system 10 and the incorporated indexing assembly 12 of the present invention are to be considered conventional for the application involved. Stainless steel, brass, and carbon steel may be used for reasons of cost and ease of manufacturing, while lightweight materials such as aluminum and even plastics may be substituted depending upon the requirements of the intended application.

As it is anticipated that certain changes may be made in the present invention without departing from the precepts herein involved, it is intended that all matter contained in the foregoing description shall be interpreted in as illustrative rather than in a limiting sense. All references and priority documents cited herein are expressly incorporated by reference.

What is claimed is:

1. A positioning system comprising:

a rotor rotatable about a central axis in a first rotary direction, said rotor having a generally annular radial portion disposed coaxially with said central axis, said radial portion having a diametric extent defined by a locus of diametral axes; and a rotary indexing assembly disposed within the diametral extent of the rotor radial portion, the assembly comprising:

a follower extending intermediate a first follower end and a second follower end, said follower being supported within said assembly intermediate said first and the follower second end to be rotatable in said first rotary direction and in a second rotary direction about said central axis opposite said first rotary direction for the positioning of said follower in alignment with a first and a second one of said diametral axes having a given angular displacement therebetween defining an indexing increment of said rotor, said follower being movable along said diametral axes in a first radial direction towards the follower first end for the disposition of said follower in a first position, and in a second radial direction towards the follower second end for the disposition of said follower in a second position;

a first actuator operably coupled with said follower, said first actuator being actuable from a de-actuated position to an actuated position effecting the movement of said follower in said first radial direction, and the rotation of said follower in said first rotary direction;

a biasing member operably coupled with said follower and said first actuator, said biasing member normally biasing said follower in said second position and said first actuator in said de-actuated position, and urging the rotation of said follower in said second rotary direction;

a first pawl operably coupled with the follower first end for movement therewith, said first pawl being disposed in the first position of said follower in an engagement with the radial portion of said rotor effecting the rotation thereof in said first rotary direction responsive to the rotation of said follower in said first rotary direction, and being disposed in the second position of said follower in a clearance relationship with said radial portion of said rotor; and a second pawl operably coupled with the follower second end and with said biasing member for movement between a locking position disposing said second pawl in an engagement with the radial portion of said rotor delimiting the rotation thereof, and a release position disposing said second pawl in a clearance relationship with said radial portion of said rotor, said biasing member normally biasing said second pawl in said locking position and said second pawl being movable, with the movement of said follower along said first one of said diametral axes from said second position to said first position, from said locking position to said release position, whereby with said follower being positioned in alignment with said first one of said diametral axes and with said biasing member biasing said follower in said second position, said first actuator in said de-actuated position, and said second pawl in said locking position, said first actuator is actuable from said de-actuated position to said actuated position effecting the movement of said follower from said second position to said first position and the movement of said second pawl from said locking position to said release position, and engaging said first pawl with the radial portion of said rotor effecting the rotation thereof in said first rotary direction by said indexing increment responsive to the rotation of said follower in said first rotary direction and into alignment with said second one of said diametral axes, and whereby with said follower being positioned in alignment with said second one of said diametral axes upon said rotor having been rotated by said indexing increment, said first actuator is de-actuable to return responsive to said biasing member said second pawl to said locking position and said follower to said second position effecting the rotation of said follower in said second rotary direction and into alignment with said first one of said diametral axes.

2. The positioning system of claim 1 wherein said first actuator is actuable responsive to a fluid pressure.

3. The positioning system of claim 1 wherein said first actuator comprises:

a first actuator housing pivotally supported in said assembly for rotation in said first and said second rotary direction with to the rotation of said follower; and a first actuator rod having a first end received within said first actuator housing, and a second end pivotally coupled to the follower first end, said first actuator rod being reciprocatingly movable within said first actuator housing from a refracted orientation corresponding to said de-actuated position of said first actuator to an extended orientation corresponding to said actuated position of said first actuator.

4. The positioning system of claim 3 wherein said first actuator rod is movable within said first actuator housing responsive to a fluid pressure.

5. The positioning system of claim 3 wherein said biasing member is a second actuator which comprises:

a second actuator housing pivotally supported in said assembly for rotation in said first and said second rotary direction with the rotation of said follower; and a second actuator rod having a first end received within said second actuator housing, and a second end pivotally coupled to the follower first end, said second actuator rod being reciprocatingly movable within said second actuator responsive to the actuation of said first actuator from a normally-biased extended orientation to a refracted orientation.

6. The positioning system of claim 5 wherein:

said first actuator rod is movable within said first actuator housing responsive to a first fluid pressure; and said second actuator rod is normally-biased in said extended orientation by a second fluid pressure.

7. The positioning system of claim 1 wherein said biasing member is a second actuator which comprises:

a second actuator housing pivotally supported in said assembly for rotation in said first and said second rotary direction with the rotation of said follower; and a second actuator rod having a first end received within said second actuator housing, and a second end pivotally coupled to the follower first end, said second actuator rod being reciprocatingly movable within said second actuator responsive to the actuation of said first actuator from a normally-biased extended orientation to a retracted orientation.

8. The positioning system of claim 7 wherein said second actuator rod is normally-biased in said extended orientation by a fluid pressure.

9. The positioning system of claim 1 wherein said radial portion of said rotor is configured as having a series of circumferentially-spaced receiving portions, each of said receiving portions being spaced-apart from an adjacent one of said receiving portions by said angular displacement, and each of said receiving portions being configured to engage said first pawl when said follower is disposed in said first position.

10. The positioning system of claim 1 wherein said second pawl comprises a linkage pivotally mounted within said assembly for rotation in said first and said second rotary direction, said linkage being coupled in force transmitting communication with said biasing member to be responsive thereto, and being engaged in said locking position of said second pawl by the follower second end effecting the movement of said second pawl from said locking position to said release position when said follower is moved along said first diametral axis from said second position to said first position.

11. The positioning system of claim 10 wherein said radial portion of said rotor is configured as having a series of circumferentially-spaced receiving portions, each of said receiving portions being spaced-apart from an adjacent one of said receiving portions by said angular displacement, and each of said receiving portions being configured to engage said second pawl when said follower is disposed in said first position.

12. The positioning system of claim 1 wherein said follower comprises:

a follower housing pivotally supported in said assembly in a driven relationship with said first actuator and said biasing member for rotation in said first and said second rotary direction; and a generally elongate slide slidably received within said housing for movement in said first and said second radial direction, said slide having a first terminus defining the follower first end and a second terminus defining the follower second end.

13. The positioning system of claim 12 wherein:

said first actuator comprises:

a first actuator housing pivotally supported in said assembly for rotation in said first and said second rotary direction with the rotation of said follower; and a first actuator rod having a first end received within said first actuator housing, and a second end pivotally coupled to the slide first terminus, said first actuator rod being reciprocatingly movable within said first actuator housing from a retracted orientation corresponding to said de-actuated position of said first actuator to an extended orientation corresponding to said actuated position of said first actuator;

said biasing member is a second actuator which comprises:
  a second actuator housing pivotally supported in said assembly for rotation in said first and said second rotary direction with the rotation of said follower; and
  a second actuator rod having a first end received within said second actuator housing, and a second end pivotally coupled to the slide second terminus, said second actuator rod being reciprocatingly movable within said second actuator responsive to the actuation of said first actuator from a normally-biased extended orientation to a retracted orientation.

14. The positioning system of claim 13 further comprising:
  a moment arm having a first end pivotally coupled in force transmitting communication with the second end of said first actuator rod, and a second end pivotally coupled in force transmitting communication to the second end of said second actuator rod; and
  a linkage having a first end pivotal coupled to the follower housing, and a second end pivotally coupled to the moment arm intermediate the first and the second end thereof.

15. The positioning system of claim 1 further comprising a shaft disposed coaxially with said central axis, said rotor being coupled in torque transmitting communication with said shaft to effect the rotation thereof in said first and said second radial direction.

16. The positioning system of claim 15 further comprising a base disposed transverse to said central axis, said indexing assembly being supported on said base, and said shaft being rotatably received through said base.

17. A positioning system comprising:
  a rotor rotatable about a central axis in a first rotary direction, said rotor having a generally annular radial portion disposed coaxially with said central axis, said radial portion having a diametric extent defined by a locus of diametral axes, and being configured as having a series of circumferentially-spaced receiving portions each formed as an opening in said radial portion of said rotor; and
  a rotary indexing assembly comprising:
    a follower extending intermediate a first follower end and a second follower end, said follower being supported within said assembly intermediate said first and the follower second end to be rotatable in said first rotary direction and in a second rotary direction about said central axis opposite said first rotary direction for the positioning of said follower in alignment with a first and a second one of said diametral axes having a given angular displacement therebetween defining an indexing increment of said rotor, said follower being movable along said diametral axes in a first radial direction towards the follower first end for the disposition of said follower in a first position, and in a second radial direction towards the follower second end for the disposition of said follower in a second position;
    a first actuator operably coupled with said follower, said first actuator being actuable from a de-actuated position to an actuated position effecting the movement of said follower in said first radial direction, and the rotation of said follower in said first rotary direction;
    a biasing member operably coupled with said follower and said first actuator, said biasing member normally biasing said follower in said second position and said first actuator in said de-actuated position, and urging the rotation of said follower in said second rotary direction;
    a first pawl comprising a first bearing supported by the follower first end operably coupled with the follower first end for movement therewith, said first pawl being disposed in the first position of said follower in an engagement with the radial portion of said rotor effecting the rotation thereof in said first rotary direction responsive to the rotation of said follower in said first rotary direction, and being disposed in the second position of said follower in a clearance relationship with said radial portion of said rotor, each of the rotor receiving portions being spaced-apart from an adjacent one of said receiving portions by said angular displacement, and each of said receiving portions being configured to engage said first pawl by receiving said first bearing therewithin when said follower is disposed in said first position; and
    a second pawl operably coupled with the follower second end and with said biasing member for movement between a locking position disposing said second pawl in an engagement with the radial portion of said rotor delimiting the rotation thereof, and a release position disposing said second pawl in a clearance relationship with said radial portion of said rotor, said biasing member normally biasing said second pawl in said locking position and said second pawl being movable, with the movement of said follower along said first one of said diametral axes from said second position to said first position, from said locking position to said release position,
  whereby with said follower being positioned in alignment with said first one of said diametral axes and with said biasing member biasing said follower in said second position, said first actuator in said de-actuated position, and said second pawl in said locking position, said first actuator is actuable from said de-actuated position to said actuated position effecting the movement of said follower from said second position to said first position and the movement of said second pawl from said locking position to said release position, and engaging said first pawl with the radial portion of said rotor effecting the rotation thereof in said first rotary direction by said indexing increment responsive to the rotation of said follower in said first rotary direction and into alignment with said second one of said diametral axes, and
  whereby with said follower being positioned in alignment with said second one of said diametral axes upon said rotor having been rotated by said indexing increment, said first actuator is de-actuable to return responsive to said biasing member said second pawl to said locking position and said follower to said second position effecting the rotation of said follower in said second rotary direction and into alignment with said first one of said diametral axes.

18. A positioning system comprising:
  a rotor rotatable about a central axis in a first rotary direction, said rotor having a generally annular radial portion disposed coaxially with said central axis, said radial portion having a diametric extent defined by a locus of diametral axes, and being configured as having a series of circumferentially-spaced receiving portions each formed as an opening in said radial portion of said rotor; and a rotary indexing assembly comprising:
  a follower extending intermediate a first follower end and a second follower end, said follower being supported within said assembly intermediate said first and the follower second end to be rotatable in said first rotary direction and in a second rotary direction about said central axis opposite said first rotary direction for the positioning of said follower in alignment with a first and a second one of said diametral axes having a given angular displacement therebetween defining an indexing increment of said rotor, said follower being movable along said diametral axes in a first radial direction towards the follower first end for the disposition of said follower in a first position, and in a second radial direction towards the follower second end for the disposition of said follower in a second position;
  a first actuator operably coupled with said follower, said first actuator being actuable from a de-actuated position to an actuated position effecting the movement of said follower in said first radial direction, and the rotation of said follower in said first rotary direction;
  a biasing member operably coupled with said follower and said first actuator, said biasing member normally biasing said follower in said second position and said first actuator in said de-actuated position, and urging the rotation of said follower in said second rotary direction;
  a first pawl operably coupled with the follower first end for movement therewith, said first pawl being disposed in the first position of said follower in an engagement with the radial portion of said rotor effecting the rotation thereof in said first rotary direction responsive to the rotation of said follower in said first rotary direction, and being disposed in the second position of said follower in a clearance relationship with said radial portion of said rotor; and
  a second pawl operably coupled with the follower second end and with said biasing member for movement between a locking position disposing said second pawl in an engagement with the radial portion of said rotor delimiting the rotation thereof, and a release position disposing said second pawl in a clearance relationship with said radial portion of said rotor, said biasing member normally biasing said second pawl in said locking position and said second pawl being movable, with the movement of said follower along said first one of said diametral axes from said second position to said first position, from said locking position to said release position, said second pawl comprising a linkage and a second bearing supported by said linkage, said linkage being pivotally mounted within said assembly for rotation in said first and said second rotary direction, and coupled in force transmitting communication with said biasing member to be responsive thereto, and said linkage being engaged in said locking position of said second pawl by the follower second end effecting the movement of said second pawl from said locking position to said release position when said follower is moved along said first diametral axis from said second position to said first position, each of the rotor receiving portions being spaced-apart from an adjacent one of said receiving portions by said angular displacement, and each of said receiving portions being configured to engage said second pawl by receiving said second bearing therewithin when said follower is disposed in said first position, whereby with said follower being positioned in alignment with said first one of said diametral axes and with said biasing member biasing said follower in said second position, said first actuator in said de-actuated position, and said second pawl in said locking position, said first actuator is actuable from said de-actuated position to said actuated position effecting the movement of said follower from said second position to said first position and the movement of said second pawl from said locking position to said release position, and engaging said first pawl with the radial portion of said rotor effecting the rotation thereof in said first rotary direction by said indexing increment responsive to the rotation of said follower in said first rotary direction and into alignment with said second one of said diametral axes, and whereby with said follower being positioned in alignment with said second one of said diametral axes upon said rotor having been rotated by said indexing increment, said first actuator is de-actuable to return responsive to said biasing member said second pawl to said locking position and said follower to said second position effecting the rotation of said follower in said second rotary direction and into alignment with said first one of said diametral axes.

19. The positioning system of claim 18 wherein said first pawl comprises a first bearing supported by the follower first end, said first bearing being configured to be received within each said opening in said radial portion of said rotor.

20. A positioning system comprising:
  a rotor rotatable about a central axis in a first rotary direction, said rotor having a generally annular radial portion disposed coaxially with said central axis, said radial portion having a diametric extent defined by a locus of diametral axes;
  a rotary indexing assembly comprising:
    a follower extending intermediate a first follower end and a second follower end, said follower being supported within said assembly intermediate said first and the follower second end to be rotatable in said first rotary direction and in a second rotary direction about said central axis opposite said first rotary direction for the positioning of said follower in alignment with a first and a second one of said diametral axes having a given angular displacement therebetween defining an indexing increment of said rotor, said follower being movable along said diametral axes in a first radial direction towards the follower first end for the disposition of said follower in a first position, and in a second radial direction towards the follower second end for the disposition of said follower in a second position;
    a first actuator operably coupled with said follower, said first actuator being actuable from a de-actuated position to an actuated position effecting the movement of said follower in said first radial direction, and the rotation of said follower in said first rotary direction;
    a biasing member operably coupled with said follower and said first actuator, said biasing member normally biasing said follower in said second position and said first actuator in said de-actuated position, and urging the rotation of said follower in said second rotary direction, the follower comprising a follower housing pivotally supported in said assembly in a driven relationship with said first actuator and said biasing member for rotation in said first and said second rotary direction;

a first pawl operably coupled with the follower first end for movement therewith, said first pawl being disposed in the first position of said follower in an engagement with the radial portion of said rotor effecting the rotation thereof in said first rotary direction responsive to the rotation of said follower in said first rotary direction, and being disposed in the second position of said follower in a clearance relationship with said radial portion of said rotor; and a second pawl operably coupled with the follower second end and with said biasing member for movement between a locking position disposing said second pawl in an engagement with the radial portion of said rotor delimiting the rotation thereof, and a release position disposing said second pawl in a clearance relationship with said radial portion of said rotor, said biasing member normally biasing said second pawl in said locking position and said second pawl being movable, with the movement of said follower along said first one of said diametral axes from said second position to said first position, from said locking position to said release position, the follower comprising a follower housing pivotally supported in said assembly in a driven relationship with said first actuator and said biasing member for rotation in said first and said second rotary direction, and the assembly further comprising a generally elongate slide slidably received within said follower housing for movement in said first and said second radial direction, said slide having a first terminus defining the follower first end and a second terminus defining the follower second end, and a shaft disposed coaxially with said central axis, said follower housing being rotatable in said first and said second rotary direction about said shaft, and said slide being formed as having a slot extending intermediate said first and said second terminus, said slot having a first slot end and a second slot end, and said shaft being received through said slot, said slide being movable on said shaft in said first radial direction into an abutting engagement of said slot second end with said shaft defining said first position of said follower, and in said second radial direction into an abutting engagement of said slot first end with said shaft defining said second position of said follower, whereby with said follower being positioned in alignment with said first one of said diametral axes and with said biasing member biasing said follower in said second position, said first actuator in said de-actuated position, and said second pawl in said locking position, said first actuator is actuable from said de-actuated position to said actuated position effecting the movement of said follower from said second position to said first position and the movement of said second pawl from said locking position to said release position, and engaging said first pawl with the radial portion of said rotor effecting the rotation thereof in said first rotary direction by said indexing increment responsive to the rotation of said follower in said first rotary direction and into alignment with said second one of said diametral axes, and whereby with said follower being positioned in alignment with said second one of said diametral axes upon said rotor having been rotated by said indexing increment, said first actuator is de-actuable to return responsive to said biasing member said second pawl to said locking position and said follower to said second position effecting the rotation of said follower in said second rotary direction and into alignment with said first one of said diametral axes.

* * * * *